United States Patent [19]

Matsuno

[11] 4,373,745
[45] Feb. 15, 1983

[54] DASH PANEL CONSTRUCTION
[75] Inventor: Yoshio Matsuno, Yokohama, Japan
[73] Assignee: Nissan Motor Co., Ltd., Yokohama, Japan
[21] Appl. No.: 190,283
[22] Filed: Sep. 24, 1980
[30] Foreign Application Priority Data
Sep. 28, 1979 [JP] Japan .................. 54-135499[U]
[51] Int. Cl.³ ............................................. B60K 37/00
[52] U.S. Cl. ....................................... 280/752; 180/90; 296/70
[58] Field of Search ................. 280/751, 752; 296/70, 296/72, 74; 180/90; 293/120, 121

[56] References Cited
U.S. PATENT DOCUMENTS
3,930,664  1/1976  Parr et al. ................. 180/90 X
3,966,227  6/1976  Cameron ..................... 280/752
4,156,045  5/1979  Burger ....................... 180/90 X FOREIGN PATENT DOCUMENTS
1292026  4/1969  Fed. Rep. of Germany ...... 280/751

286483   3/1928  United Kingdom .
559743   3/1944  United Kingdom .
842765   7/1960  United Kingdom .
850741  10/1960  United Kingdom .
872540   7/1961  United Kingdom .
1131673 10/1968  United Kingdom .
1292016  4/1969  United Kingdom .
1354839  5/1974  United Kingdom .
1435441  5/1976  United Kingdom .

Primary Examiner—Joseph F. Peters, Jr.
Assistant Examiner—Michael Mar
Attorney, Agent, or Firm—Thompson, Birch, Gauthier & Samuels

[57] ABSTRACT

A securing flange extends from a portion of a structural panel to define a cavity between it and an adjacent portion of the panel. Apertures formed in the panel open into the cavity so that when an elastomeric pad is formed on the panel the flange extends into the pad and parts of the pad which extend through the apertures are formed with grommet-like locking blocks which engage the opposite side of the panel to secure the pad on the panel without the use of adhesives.

2 Claims, 8 Drawing Figures

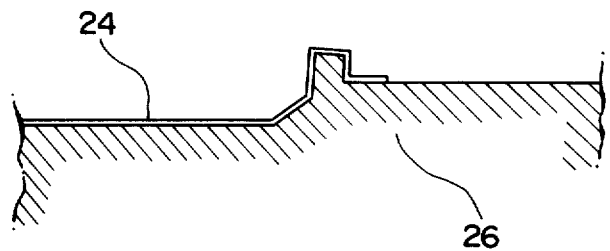
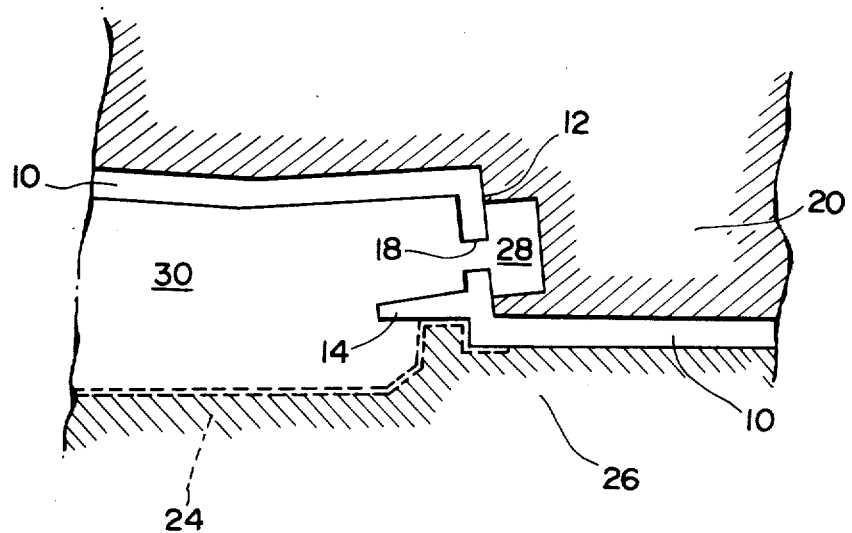

DASH PANEL CONSTRUCTION

BACKGROUND OF THE INVENTION

1. Field of the Invention

The present invention relates to a vehicle dash panel and more particularly to an apparatus and method of forming and retaining an elastomeric pad on a structural panel defining part of the dash panel, which both simplifies production and eliminates the need for special adhesives and processes for applying same.

2. Brief Description of the Prior Art

In a known arrangement, an elastomeric pad and a structural panel for supporting same have been prepared separately, and subsequently an adhesive layer applied to the panel and the pad then placed onto and secured to the panel by the adhesive layer.

This arrangement, however has suffered from a number of drawbacks, both in terms of durability and in ease of production. A pad secured to a panel in the manner just described has, under various conditions such as high temperature (due to sunlight impinging thereon through the windshield of the vehicle), vibration (from the engine, road, etc.), high humidity, etc., tended to peel off the panel, particularly along the upper front edge thereof. Moreover, during production, the use of the adhesive material has proven to be difficult to handle and a health hazard to the workers using same.

SUMMARY OF THE INVENTION

The present invention features an apparatus and method of forming and retaining an elastomeric pad on a vehicle dash panel so that it is fixedly held on the panel without the use of toxic and troublesome adhesives.

One aspect of the invention features a flange which extends from the structural panel and into the pad to secure same onto the panel.

Another aspect of the invention features a plurality of spaced apertures through which grommet-like formations of the pad extend to secure the pad on the panel.

The preferred embodiment of the present invention combines both of the above features and arranges the flange to define a cavity between it and an adjacent portion of the panel. The apertures are formed to open into the cavity so that when the pad is formed on the panel, part of the pad is encased in the cavity and some of the pad (during the molding process) passes through the apertures to form grommet-like locking blocks on the other side of the panel. The locking blocks firmly hold the terminal edge of the panel on the panel, preventing any tendancy to peel off, and eliminate the need for adhesives.

BRIEF DESCRIPTION OF THE DRAWINGS

The features and advantages of the method and apparatus of the present invention will become more clearly appreciated from the following description taken in conjunction with the accompanying drawings in which like reference numerals denote corresponding elements, and in which

FIG. 5 is a sectional view showing a decorative pad skin disposed in the lower die block of a mold utilized in producing the present invention;

FIG. 6 is a sectional view showing a panel according to the present invention set into an upper die block which is seated on the lower block shown in FIG. 5 to define the mold for forming the elastomeric pad proper;

DETAILED DESCRIPTION OF THE PREFERRED EMBODIMENT

Figure 1:
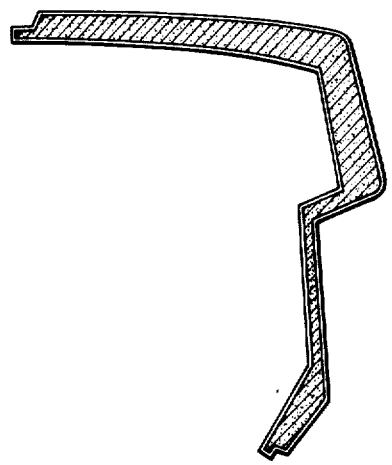
FIG. 1 is a sectional view of a prior art elastomeric pad prior to adhesion to the appropriate panel as discussed in the introductory part of the specification.
Figure 2:
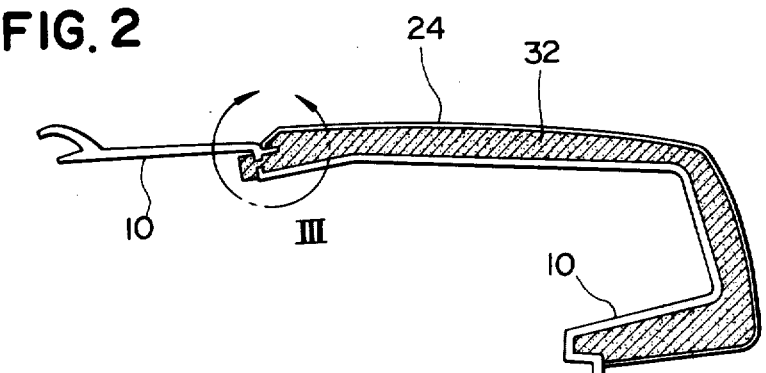
FIG. 2 is a section view of a dash panel according the present invention.
Figure 3:
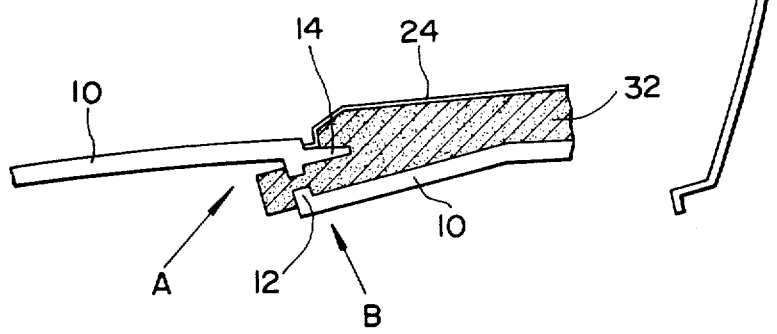
FIG. 3 is an enlarged view of that part of FIG. 2 enclosed in the circle III.
Figure 4:
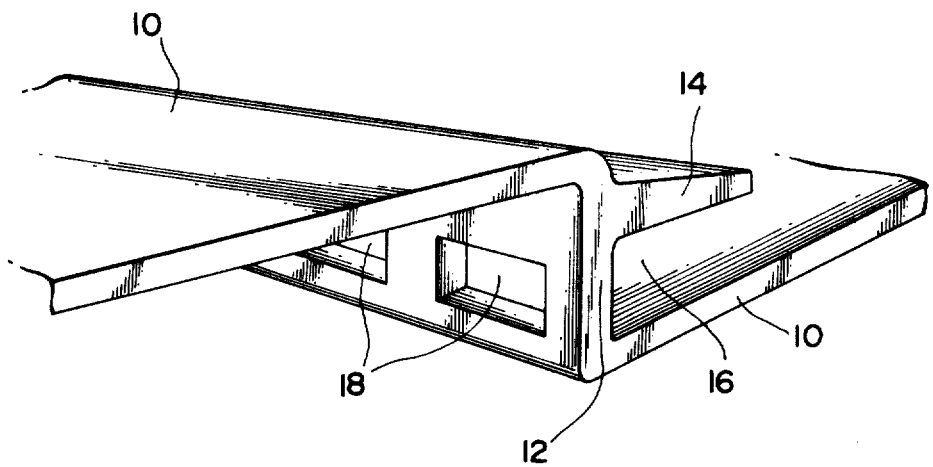
FIG. 4 is a perspective view of the structural panel according to the present invention showing both the retaining flange and the apertures which characterize the invention.

Turning now to the drawings and more specifically to FIGS. 2, 3 and 4, a preferred embodiment of the present invention is shown. As best shown in FIG. 4, a structural panel 10 is formed with a step like portion 12 from which a securing flange 14 extends to define a cavity 16. A plurality of apertures 18 are formed in the step portion to open into the cavity 16.

During production, this panel 10 is placed in an upper die block 20 of a mold 22, as best shown in FIG. 6. As desired, a decorative skin 24 can be placed in the lower die block 26 subsequent to a vacuum forming process or the like. Of course it is well within the scope of the present invention to utilize an elastomer having self skin forming properties in lieu of the skin 24.

As shown in FIG. 6, the upper die block 20 is formed with cavities 28 (only one is illustrated) which serve as both gas and air vents and which form an important part of the pad according to the present invention. Thus, when the elastomer (eg. urethane) is injected into the main cavity 30, defined between the skin 24 and the panel 10, the air and gas are vented from the main cavity via the cavities 28. Subsequently, upon filling the main cavity, the elastomer overflows through the apertures 18 into the cavities 28. At this point, injection of the elastomer is terminated. When the elastomer cures, the upper and lower die blocks are separated, and the panel 10 with the elastomeric pad 32 attached thereto is removed from the upper die block in the finished form illustrated in FIG. 2.

Figure 7:
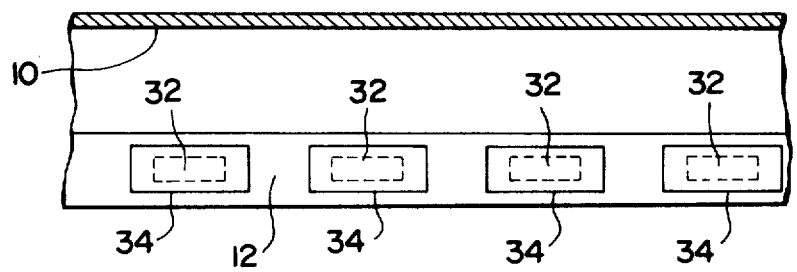
FIG. 7 is a view taken along arrow A in FIG. 3.
Figure 8:
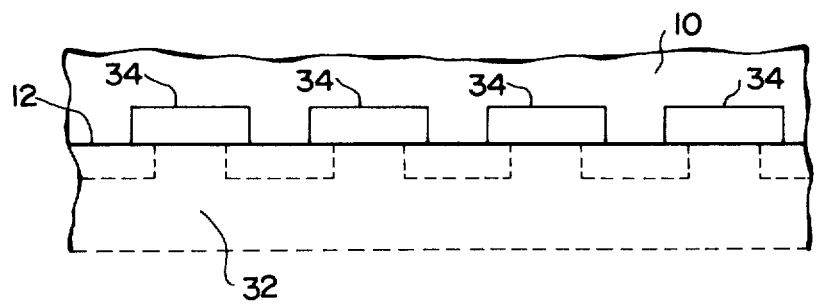
FIG. 8 is a view taken along arrow B in FIG. 3.

FIGS. 7 and 8 show views taken along arrows A and B, respectively, of FIG. 3. In these figures, the grommet-like locking blocks 34 formed in the cavities 28 are clearly illustrated.

Of course, the present invention is not limited to the use both of the flange 14 and the apertures 18 (and locking blocks 34), and either one or both may used as desired.

It is of course within the scope of the present invention to use a locking flange (or flanges) and/or apertures at a number of locations for securing the pad onto the panel. For example, such a technique and apparatus as taught by the present invention may be used at the lower edge 36 of the pad 32.

It further goes without saying that the present invention can find application in fields other than dash panel constructions and should not be deemed so limited.

What is claimed is:

1. A dash panel comprising: a structural panel member having a step like portion, an integral flange on said panel member protruding from said step like portion and cooperating with adjacent surfaces on a first side of said panel member to define a cavity, apertures the step portion of in said panel member opening into said cavity, and an elastomeric pad molded on the first side of said panel member, with the flange on said panel member protruding into said pad and with said pad having integral portions protruding through said apertures to terminate as locking blocks which are engageable with an opposite second side of said panel member.

2. A method of forming a dash panel having an elastomeric pad supported by a structural panel member, comprising:

(a) forming said structural panel member with: (i) a step like portion, (ii) a flange extending from said step like portion to cooperate with adjacent surfaces on a first side of said panel member in defining a cavity, and (iii) apertures in the step portion of said panel member opening into said cavity; and (b) molding said elastomeric pad on a first side of said panel member, with said flange being embedded in said pad, and with a portion of said pad extending into said cavity and through said apertures to form locking blocks engageable with an opposite second side of said panel member.

* * * * *